INVENTORS:
John F. Aiken,
BY Frank A. Tompkins
& Donald C. Zapf
ATTORNEY

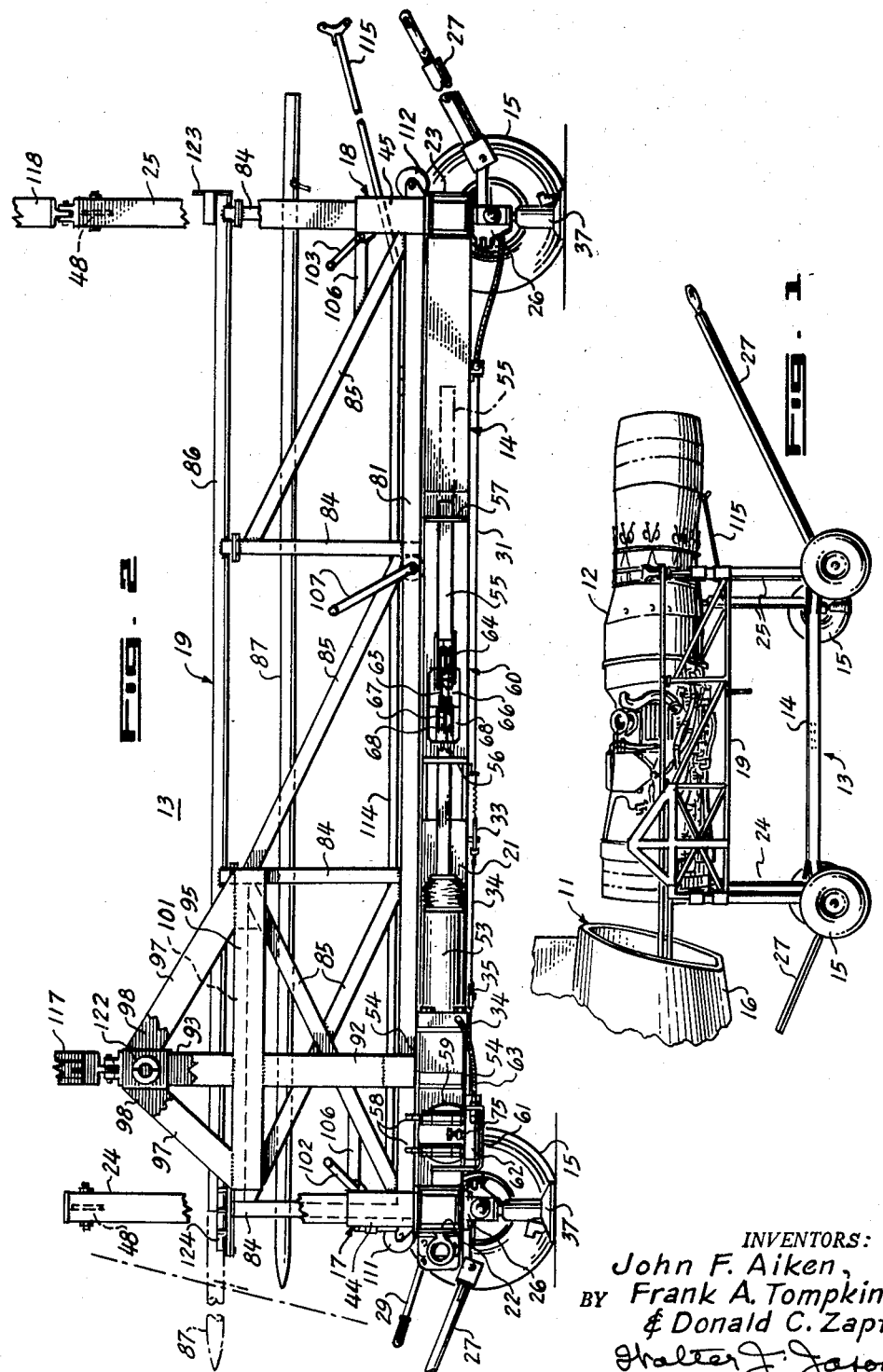
Jan. 6, 1959 — J. F. AIKEN ET AL — 2,867,334
HANDLING APPARATUS
Filed Sept. 10, 1954 — 3 Sheets-Sheet 1
INVENTORS:
John F. Aiken,
Frank A. Tompkins
& Donald C. Zapf
ATTORNEY Jan. 6, 1959   J. F. AIKEN ET AL   2,867,334
HANDLING APPARATUS
Filed Sept. 10, 1954   3 Sheets-Sheet 2

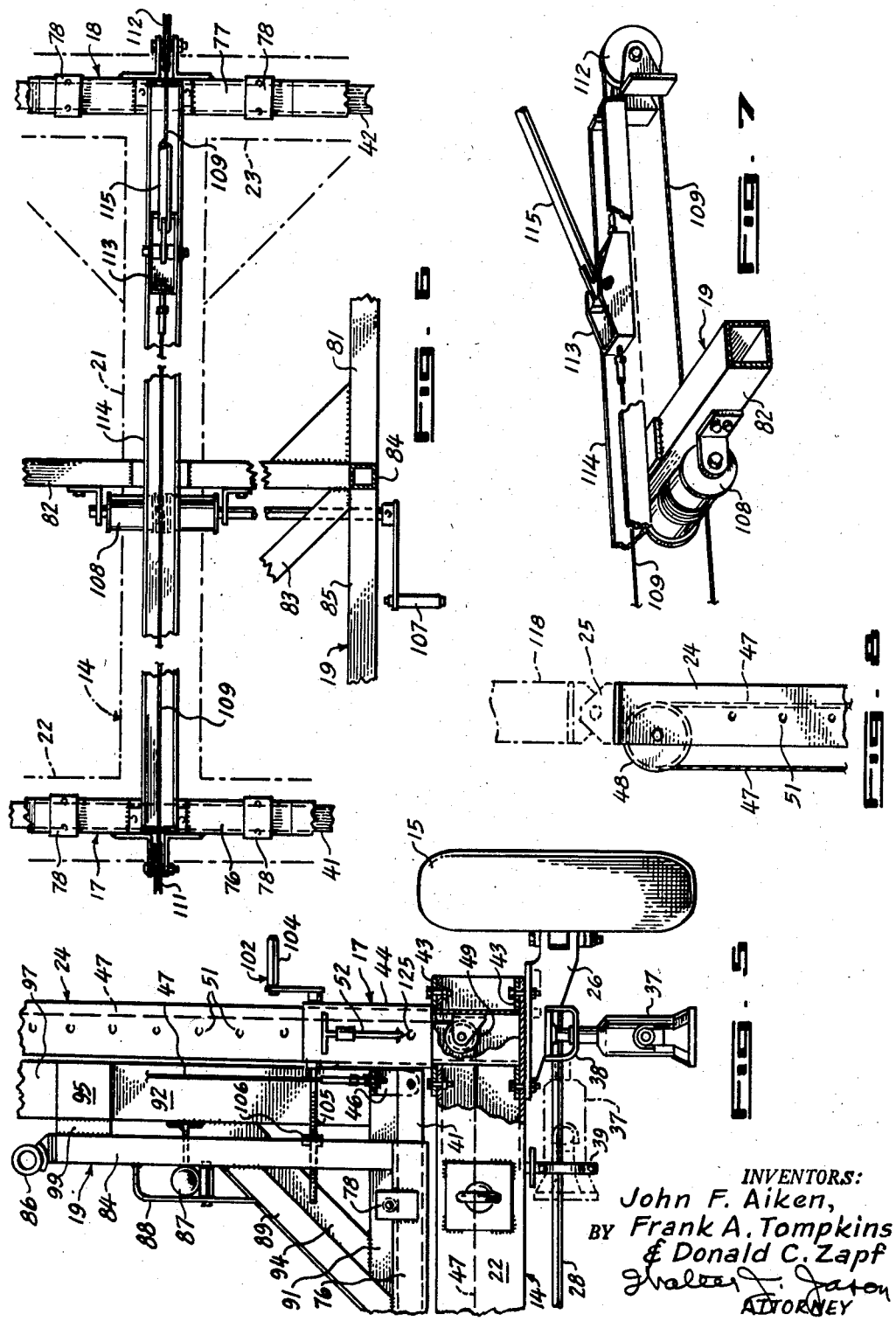

United States Patent Office 2,867,334
Patented Jan. 6, 1959

2,867,334

HANDLING APPARATUS

John F. Aiken, La Mesa, Frank A. Tompkins, Chula Vista, and Donald C. Zapf, Whittier, Calif., assignors to General Dynamics Corporation, San Diego, Calif., a corporation of Delaware Application September 10, 1954, Serial No. 455,246

6 Claims. (Cl. 214—1)

The present invention relates to handling apparatus and more particularly to handling apparatus for use in connection with the handling of articles of relatively large bulk.

The present invention has been found to have particular adaptability for use with jet engines to afford effective installation, removal and repair thereof. In order to prevent maladjustment or damage to the relatively delicate and intricate components of present day jet engines it is necessary that special care be exercised in the handling and movement of such engines. For example, during the installation of a jet engine in an aircraft, the engine must be at a suitable height, in longitudinal alignment with the aircraft engine receiving structure, and so disposed and mounted that controlled movement of the engine into the aircraft may be achieved. If apparatus for effecting these ends is not provided, it is apparent that the engine may strike against portions of the fuselage with resultant damage to both the engine and the aircraft. However, the length, weight, and general bulk of conventional jet engines make the engines difficult to handle with conventional handling equipment, and an economical and precise apparatus for moving, positioning, and manipulating such engines is necessary.

Accordingly, the handling apparatus of the present invention provides a satisfactory means for accomplishing the desirable results just described, and further serves as a supporting stand for the repair and examination of jet engines and the like. Generally, the apparatus of the present invention comprises a cradle structure movably and adjustably supported by a base frame which is mounted upon wheels adapted for steering and positioning the apparatus. Vertical, transverse, and longitudinal adjustment of the position of an engine carried in the cradle may be effected through movement of the cradle with respect to the base frame, and other adjustments of the position of the engine may be had through the actuation of means for controllably moving the base frame with respect to the ground or floor. Thus, the apparatus is adapted effectively to locate the engine in position for installation, as in an aircraft, and the construction of the apparatus is such that the engine may be rolled into the aircraft as desired.

It is to be understood that the present apparatus is also adapted to provide controlled movement or manipulation of various objects, particularly elongated structure such as airplane fuselage sections and various types of engines, and the apparatus is not therefore to be limited in scope to the precise use with jet engines which is herein described.

It is, therefore, a principal object of the present invention to provide an improved apparatus for handling heavy and cumbersome objects.

Another object of the invention is to provide a novel mobile and selectively controllable apparatus for use in connection with the installation, removal, and repair of engines.

An additional object of the invention resides in the provision of an improved apparatus for transporting an engine and which is adapted to permit work upon and examination of the engine.

A further object of the invention is to provide a unique apparatus which is adapted to selectively effect longitudinal, vertical, and transverse movement and adjustment of a jet engine with respect to an aircraft to thereby enable efficient and ready installation or removal of such engine from the aircraft.

It is yet another object of the invention to provide a novel and efficient apparatus for installing and removing a jet engine, which is adapted for convenient and expeditious use in conjunction with such an engine, and which is simple and economical to manufacture.

Other objects and features of the present invention will be readily apparent to those skilled in the art from the following specification and appended drawings wherein is illustrated a preferred form of the invention, and in which:

Figure 1 is a perspective view of a handling apparatus in accordance with the present invention, and having a jet engine mounted thereupon;

Figure 2 is a side elevational view of the handling apparatus, the wheels on one side having been omitted and other portions broken away for clarity;

Figure 4 is an end elevational view of the apparatus;

Figure 5 is an enlarged partial end elevational detail view of the apparatus;

Figure 6 is a partial detail plan view illustrating the means for effecting longitudinal movement of the engine upon the cradle of the present apparatus;

Figure 7 is a detail perspective view illustrating the movable shoe of the means illustrated in Figure 6; and Figure 8 is a detail view of a portion of a forward corner post, illustrating its pulley arrangement.

Figure 3:
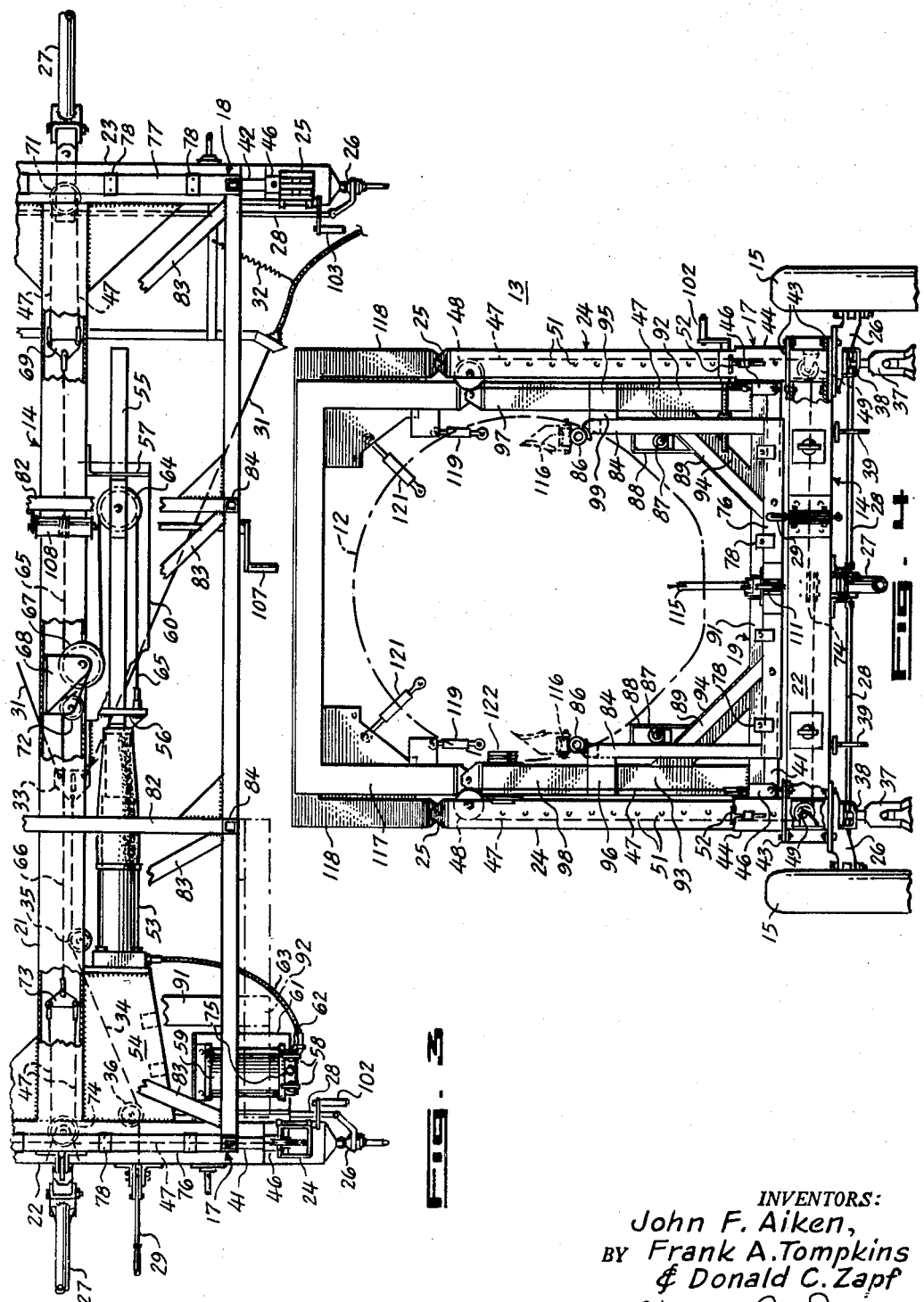
Figure 3 is a partial plan view of the apparatus, illustrating the construction thereof.

Referring to the drawings and more particularly to Figure 1, there is illustrated a portion of an aircraft 11, and an embodiment of the present invention which is adapted for use in the installation or removal of a conventional jet engine 12 with respect to the aircraft 11 which is of the type which carries the engine in its rear fuselage portion. It will be apparent, however, that the present invention is readily adapted for use in conjunction with various types of engines and aircraft, and in addition is adapted for the handling of heavy structures or equipment of a related or similar nature.

The handling apparatus of the present invention is designated in its entirety by the numeral 13, and, as best illustrated in Figures 2 through 5, comprises generally a lower supporting structure or base frame 14 which is supported upon four wheels 15 whereby base frame 14 is capable of movement into a desired position such as, for example, behind the fuselage 16 of aircraft 11. Frame 14 carries a pair of vertically movable transverse supports 17 and 18 which in turn carry an upper supporting structure or cradle 19, the arrangement of these components being such as to permit adjustable horizontal and vertical relative movement of cradle 19 with respect to base frame 14, as will be more particularly described hereinafter, to thereby enable positioning of cradle 19, and the engine 12 it is adapted to carry, in longitudinal alignment with fuselage 16 of aircraft 11.

Base frame 14 includes a hollow longitudinally extending centrally located base member 21 which is rigidly connected, as by welding and suitable reinforcing plates, at one end to a hollow transverse front member 22, and at its other end to a hollow transverse rear member 23 to thereby form generally an "I" shaped structure or chassis. Upon this chassis there are mounted a forward pair of corner support posts 24 and a rearward pair of corner support posts 25, supports 24 being disposed through the upper wall of front member 22 adjacent the ends thereof, and corner support posts 25 being disposed through the upper wall of rear member 23 adjacent the ends thereof. As will be seen, front support 17 is mounted for vertical movement between support posts 24, and rear support 18 is mounted for vertical movement between support posts 25, cradle 19 moving in correspondence with the vertical movement of front support 17 and rear support 18.

Wheels 15 are operatively located at the end portions of transverse members 22 and 23, being secured to corresponding conventional wheel mount fittings 26 which are rigidly secured to the lower wall of the corresponding transverse members 22 and 23 whereby handling apparatus 13 is made mobile. Fittings 26 afford pivotal connections of the wheels 15 to the transverse members 22 and 23 whereby wheels 15 may be pivoted or turned to thereby steer apparatus 13. To facilitate the pivotal movement of wheels 15 upon fittings 26 there are provided a pair of steering or tow bars 27 which are each pivotally secured at one end to a corresponding one of transverse members 22 and 23, and operatively connected to the associated pair of wheels 15 in any suitable manner, as by a pair of usual steering rods 28. Bars 27 and rods 28 have been provided at both ends of apparatus 13 merely for convenience in steering and towing of apparatus 13. It is apparent that, if desired, a bar 27 and rods 28 may be provided at only one end, if that is sufficient to the needs of a potential user.

Handling apparatus 13 is adapted to be securely maintained in any position, with respect to the ground by means of usual and conventional mechanical type brakes manually actuated by a conventional handle and over-center actuating mechanism 29 which is provided at the forward wall of transverse member 22. In the present embodiment these conventional mechanical type brakes are embodied in the rear wheels 15, and are coupled to over-center actuating mechanism 29, Figure 3, by a pair of cables 31 which are secured to a pivot plate 33 suitably mounted to the underside of base member 21 and which in turn is coupled to mechanism 29 by a cable 34 trained about a pulley 35 and a pulley 36 which also are secured beneath the lower wall of base member 21. Slack in the pair of cables 31 is taken up by the action of a suitably mounted spring 32. Downward urging of the handle of mechanism 29 provides a pull on cables 31 and 34 to effect a braking force upon the rear wheels 15, the handle of mechanism 29 in this operation being manually moved over-center to be releasably maintained in its downward or locked position. It is understood that the particular construction of the brakes here employed or the mechanism for actuating such brakes do not form a part of this invention as any suitable, conventional brake construction and actuator may be used.

A plurality of usual hydraulic piston type jacks 37, preferably one at each end of transverse members 22 and 23, are provided to effect a steadying action for apparatus 13 after it has been braked in a desired position. In addition, it is noted that jacks 37 are adapted to adjust the vertical position of the engine or load which may be carried in cradle 19, by virtue of the upward and downward movement afforded base frame 14. Each jack 37 is mounted to base frame 14 by means of a corresponding wheel mount fitting 26, Figure 5. Each bracket 38 embodies a transverse slot (not shown) which serves to restrainably receive and support the upper end of the usual movable piston or ram of jack 37 whereby bracket 38 serves to carry jack 37 when it is telescoped or inoperative. Jacks 37 can be pivoted inwardly, when desired, to a stowed position against the under surfaces of transverse members 22 and 23, and a corresponding number of brackets 39 are provided to secure jacks 37 in this stowed position whereby jacks 37 will not affect the mobility of apparatus 13.

Corner support posts 24 and 25 which, as hereinabove stated, form a part of base frame 14 are disposed through mating openings provided in members 22 and 23 of base frame 14 and rest upon the lower walls thereof, as best illustrated in Figure 5. A pair of plates 43 each having a central opening for the accommodation of one of the support posts 24 and 25, serve to maintain the support posts 24 and 25 fixed and in proper relation with transverse supports 17 and 18 to insure cooperation therebetween as will be seen. One of each of the pair of plates 43 is suitably bolted upon the lower wall of transverse member 22 or 23, as the case may be, and the other of the pair of plates 43 is bolted upon the upper wall thereof and welded to a corresponding one of the corner posts 24 or 25. It is noted that with this arrangement corner posts 24 and 25 may be readily disconnected from transverse members 22 and 23 if desired.

Front support 17 includes a transverse member 41 which extends between and is connected at its ends to a pair of oppositely disposed, upstanding sleeves 44 by a pair of inwardly disposed brackets or portions 46 which are welded to sleeves 44, sleeves 44 being adapted to slide up and down upon corner posts 24 and carrying transverse member 41 therewith. Rear support 17 includes a similar transverse member 42 which extends between sleeves 45 and is similarly conected thereto, sleeves 45 being adapated to slide up and down upon their associated corner posts 25 and carrying transverse member 42 therewith. Front support 17 and rear support 18 are identical and for this reason the description hereinatfer made will be primarily directed to the construction and operation of front support 17, with the understanding that the description is equally applicable to rear support 18.

Each of the inwardly disposed brackets or portions 46 embody an opening within which is restrainably housed the usual end fitting of a cable 47, which cable 47 serves to effect the raising and lowering of front support 17 in conjunction with other cables and means (to be described) located and trained through the hollow portions of members 21, 22, and 23 of base frame 14, and support posts 24 and 25.

Each of the pair of cables 47 extends upwardly, Figures 4, 5, and 8, from its end fitting and is trained about a pulley 48 which is rotatably mounted at the upper end of a respective support post 24, and thence cables 47 are led downwardly through the hollow interior of posts 24 and about pulleys 49 mounted at the lower end of posts 24. An identical arrangement of cables 47 and associated pulleys 48 and 49 is to be found within posts 25 and transverse member 23. With the cable and pulley arrangements, as described, a drawing of cables 47 inwardly toward the center of base frame 14, by actuating means to be hereinafter described, effects a raising of supports 17 and 18, and conversely, when cables 47 are not being subjected to a pulling force, supports 17 and 18 and the cradle 19 mounted thereupon will travel downwardly by virtue of their weight.

The vertical position of supports 17 and 18, and consequently the position of cradle 19, thus will be changed in correspondence with any change in the position of cables 47. In order to prevent damage to the structure of apparatus 13 in the event of any breaking of cables 47, for example, there are provided in posts 24 and 25 a plurality of vertically aligned openings 51 which are adapted to receive corresponding pins 52. Pins 52, illustrated in the drawings in a stowed position, will when in operative position act as stops engageable by sleeves 44 and 45 to provide a safety means for limiting the downward travel of supports 17 and 18.

The means for moving and adjusting the position of cables 47, and consequently cradle 19, will next be described. A conventional hydraulic ram 53 is horizontally disposed and rigidly mounted at its base to the edges of a pair of horizontally disposed and vertically spaced plates 54 which are rigidly welded, as best illustrated in Figures 2 and 3, to central member 21 and front member 22 of base frame 14. Hydraulic ram 53 includes a movable ram portion 55 which is disposed in substantial parallelism with central base member 21. Ram portion 55 is guided in its longitudinal movement by its disposition through suitable openings provided in the end walls 56 and 57 of a housing 60 which is welded to base member 21 and which communicates with the interior of member 21 through an opening provided in the side wall of member 21. The longitudinal movement of ram portion 55 through the openings in walls 56 and 57 is effected through actuation of hydraulic ram 53, as will be described. It is noted that ram 53 is shown in Figure 2 in its retracted position, and in Figure 3 in its extended position to illustrate the extreme positions thereof.

A pair of usual and conventional hydraulic pumps 58 for actuating ram 53 are fixed to the outer end of a reservoir 59 which is secured to the rearward face of front transverse member 22 of base frame 14 by a support bracket 61. Pumps 58 are actuated by hand, displacing hydraulic oil taken from reservoir 59, and channeling such oil through a usual manifold 62, and thence through hydraulic line 63 to ram 53 whereby ram portion 55 is moved to the right, as viewed in Figures 2 and 3. It is noted that pumps 58 may be operated singly or together, depending upon the speed of displacement of ram portion 55 which is desired, operation of both pumps 58 of course increasing the speed of movement.

A horizontally disposed double sheave or pulley 64 is suitably rotatably mounted on ram portion 55 in a through opening therein. In addition, a pair of cables 65 and 66 are secured one above the other to wall 56 of housing 60 and trained about double pulley 64. Cables 65 and 66 next are trained from double pulley 64 about a similar double pulley 67, which is suitably secured for rotation between a pair of spaced reinforcing plates 68 which are welded to base member 21.

Cable 65 proceeds rearwardly from pulley 67, through the hollow interior of member 21, and is secured at its rearward end to a swivel plate 69 to which are connected the pair of cables 47 which cooperate to raise and lower rear transverse support 18. These cables 47 are disposed about a double sheave or pulley 71, which is suitably rotatably mounted within the hollow interior of rear member 23, cables 47 then being led about respective pulleys 49 toward pulleys 48 as previously described.

Cable 66 proceeds forwardly from pulley 67, through the hollow interior of member 21, and thence about a guide pulley 72 which is suitably mounted and supported by brackets or the like within the hollow interior of member 21. Cable 66 is connected at its forward end to a swivel plate 73 which has connected to it the pair of forwardly disposed cables 47 which cooperate to raise and lower forward transverse support 17. These cables 47 extend from swivel plate 73 about a double sheave or pulley 74, which is suitably rotatably secured within the hollow interior of forward member 22, and thence about the respective pulleys 49 and pulleys 48, as before described.

It will be apparent that operation of pumps 58 will cause hydraulic fluid to flow into hydraulic ram 53, effecting a rearward movement of ram portion 55 and a corresponding rearward displacement of the pulley 64 which is mounted on ram portion 55. Consequent movement of cables 65 and 66 is transmitted through pulleys 71 and 74, respectively, through cables 47, to front support 17 and rear support 18 whereby supports 17 and 18 are raised. Conversely, by operation of a suitable valve 75 mounted upon manifold 62, hydraulic fluid is allowed to drain from ram 53 into reservoir 59 whereby supports 17 and 18 are permitted to proceed downwardly of their own weight. In this manner, cradle 19 is raised or lowered to thereby position engine 12 at the desired height for installation or removal thereof. It is noted that the disposition of cable 65 and cable 66 about pulley 64 and double pulley 67 is such, for example, that a movement by pulley 64 effects movement by cables 65 and 66 but in a greater amount whereby apparatus 13 is characterized by a desirable amplification of the movement of ram portion 55.

Cradle 19 comprises a plurality of varous tubular support and brace members suitably welded together to form a rigid composite structure which is characterized by comparatively high strength. Cradle 19 includes a forward tubular member 76 of generally rectangular section and a like rearward tubular member 77 which are respectively fitted around transverse members 41 and 42 of supports 17 and 18 in sleeve-like and sliding relationship whereby tubular members 76 and 77 are adapted for transverse movement. This slidable movement, which is adjustable in a manner to be more particularly described hereinafter, is facilitated by rolling contact had between members 76 and 77 and supports 17 and 18, respectively, which, as best illustrated in Figures 4, 5, and 6, is provided by a plurality of usual roller bearings in housings 78 suitably mounted upon transverse members 76 and 77.

Tubular members 76 and 77 are rigidly connected together by a pair of cradle longitudinals 81 which extend between the ends of members 76 and 77, and this structure is strengthened and reinforced by a plurality of horizontal transverse braces 82 and a plurality of horizontal diagonal braces 83 which are suitably disposed and welded together as illustrated.

The sides of cradle 19 are formed by a plurality of spaced uprights 84 which are welded at their lower ends to longitudinals 81, uprights 84 being reinforced and supported in this position by a series of diagonal braces 85, and by a pair of rails 86 which are bolted to the upper ends of uprights 84. It is to be noted that a pair of extensions 87 for rails 86 are illustrated demounted and in their stowed position within a plurality of holding brackets 88 which are rigidly secured between uprights 81 and diagonal braces 89. Braces 89 are each welded at one end to uprights 84 and at the other end to horizontal transverse braces 82 to thereby strengthen and reinforce the structure of the sides of cradle 19.

Near the forward end of cradle 19 there is located a plurality of supports and braces of preferably greater cross sectional area than other portions of cradle 19 whereby it is better adapted to receive and transmit the weight of engine 12, which is locally concentrated at that point, to the other structure of cradle 19. Thus, a base member 91 is transversely disposed across longitudinals 81 and welded thereto near the ends thereof. A side member 92 and a side member 93 are vertically disposed and welded to member 91 at the ends thereof for reinforcement, side members 92 and 93 in turn being reinforced and maintained in this position by transverse diagonals 94 which are disposed across vertical braces 85, braces 85 being suitably cut away at this point and welded to the forward and rearward walls of diagonals 94. In addition, a longitudinal member 95 and a longitudinal member 96 are disposed across the side members 92 and 93, respectively, and welded thereto, and reinforced by a pair of diagonal braces 97 and a pair of diagonal braces 98, respectively, as illustrated. Longitudinal members 95 and 96 are each welded to suitably spaced members 99 which are in turn welded to reinforcing longitudinals 101 secured between the upper ends of a pair of adjacent uprights 84 to produce a strong and rigid structure for supporting engine 12.

Transverse movement and adjustment of cradle 19 upon transverse members 41 and 42 of supports 17 and 18 is effected through manual actuation of a pair of identical adjusters 102 and 103 located at either end of the cradle 19. Adjusters 102 and 103 each comprise a handle 104, Figures 2 and 5, which is connected to a shaft 105 rotatably mounted upon a projecting portion of a corresponding sleeve 44 or 45. Shaft 105 embodies a threaded end portion which is inwardly disposed and threadably connected to a plate 106 which is welded between a pair of adjacent uprights 84 whereby rotation of shaft 105 by actuation of handle 104 effects a transverse movement of cradle 19. It is noted that a limited adjustment of cradle 19 in yaw is provided by actuating one of adjusters 102 or 103 more than the other, the threadable connection of the pair of shafts 105 to their respective plates 106, and the fit of tubular members 76 and 77 about transverse members 41 and 42, being sufficiently loose to permit the slight misalignment of shafts 105 in plates 106 which occurs when one of the adjusters 102 or 103 is actuated more than the other.

Longitudinal movement and adjustment of engine 12 upon cradle 19 is effected through manual actuation of a crank 107 which is rotatably disposed through one of the pair of longitudinals 81 and connected to a cable drum 108, as best illustrated in Figures 6 and 7. Drum 108 is rotatably mounted to an adjacent horizontal transverse brace 82 and carries several turns of a cable 108 which is trained from drum 108 about rotatably mounted pulleys 111 and 112 located at opposite ends of cradle 19. Cable 109 is connected to a slide or shoe 113 which is slidably disposed within a fixed trough or track 114 formed of a channel member longitudinally extending along the base of cradle 19 and which is welded, but may be suitably bolted, to members 76, 77, 82, 83, and 91 of cradle 19. A conveyor or actuator bar 115 is pivotally mounted at its lower end to shoe 113 and at its upper end is adapted for pivotal connection to engine 12 whereby movement afforded shoe 113 will effect a corresponding movement of engine 12. Longitudinal movement of engine 12 is facilitated by utilizing two pairs of rollers 116, or the like, which conventionally are operatively affixed upon the engine. The rollers 116 are conventionally so located that they can be readily accommodated by rails 86 of cradle 19 whereby the installation or removal of engine 12 from aircraft 11 will be characterized by smooth and easy movement.

Adjustable movement of engine 12 forwardly is effected by manual rotation of crank 107 in a counterclockwise direction (as viewed in Figure 6), causing a rotation of cable drum 108 and a consequent forward pull upon cable 109. Shoe 113 under the urging of cable 109 then slides within track 114 toward the forward end of cradle 19 pulling bar 115 and consequently pulling engine 12 longitudinally along rails 86 of cradle 19.

During ground transportation of engine 12 upon apparatus 13 it is generally desirable to carry engine 12 in a manner insuring steady support of engine 12 without sway or longitudinal movement or the like. Thus there is provided a pair of overhead supports 117 and 118 which are securely but readily detachably fastened to the upper ends of side members 92 and 93, and to the upper ends of the pair of corner support posts 25, respectively. As best illustrated in Figure 4, overhead support 117 suitably pivotally carries a pair of turnbuckles 119, while overhead support 118 carries a pair of turnbuckles 121, turnbuckles 119 and 121 in turn being adapted for pivotal connection to engine 12. In addition, there is provided near the upper end of side member 93 a thrust mount 122 which is adapted for connection to a mating fitting (not shown) conventionally carried by the usual jet engine 12 and which serves to prevent longitudinal movement of engine 12 upon apparatus 13. Thrust mount 122 is affixed to side member 93 by being bolted in position whereby it may be easily removed when desired. The provision of mount 122 and turnbuckles 119 and 121 for support of engine 12 is substantially identical to the means for supporting engine 12 which is provided in the actual aircraft 11. Thus, the comparatively rigid and steady support of engine 12 in aircraft 11 is substantially duplicated by apparatus 13 of the present invention.

The operation of apparatus 13 will now be detailed. The engine 12 which is desired to be installed in an aircraft 11 will, through the use of appropriate lifts be positioned on apparatus 13 suspended from turnbuckles 119 and 121 and maintained in longitudinal position by thrust mount 112 with rollers 116 being spaced slightly above tubular rails 86. Aircraft 11 is desirably stabilized in some suitable manner, such as by raising it off its landing gear by a plurality of jacks, and rail extensions 87 are removed from their position upon apparatus 13 and installed within aircraft 11 upon suitable fittings (not shown) which are conventionally fixedly carried by aircraft 11. The ends of rail extensions 87 will then protrude from fuselage 16 and alignment of rails 86 with rail extensions 87 must next be effected and such operation will now be described.

Apparatus 13 through manipulation of tow bar 27 is maneuvered until approximate longitudinal alignment of rails 86 with rail extensions 87 is achieved, and the brakes for wheels 15 are then set by actuating mechanism 29. Thrust mount 122 is removed and turnbuckles 119 and 121 loosened until rollers 116 rest upon tubular rails 86, after which the turnbuckles are disconnected and engine 12 is manually moved rearwardly against a pair of stops 123, Figure 2, on rails 86 and secured in this position by any suitable means such as a C clamp or the like. Overhead support 118 is then detached from apparatus 13 in order to permit raising of cradle 19, and if desired, overhead support 117 may also be detached and set aside.

Either or both of pumps 58 are then actuated to effect a rearward movement of ram portion 55 to apply a pulling force on cables 47 to raise cradle 19 to a height where tubular rails 86 are approximately in the same horizontal plane as rail extensions 87, pins 52 next being placed in openings 51, either through an opening 125 in each sleeve 44 and 45, or beneath the lower edge of sleeves 44 and 45, as desired. As previously described, pins 52 serve as safety means, cooperating with sleeves 44 and 45 to prevent cradle 19 from falling in the event of a cable failure or the like. Apparatus 13 is then rolled forward or aft, if necessary, for proper positioning, the brakes for wheels 15 being appropriately released and reset when this positioning is completed. To maintain a steady and level platform and to effect a finer adjustment of the vertical position of rails 86, jacks 37 are now dropped into position and one or more such jacks are then operated as necessary.

Either or both of transverse adjusters 102 and 103 are next actuated as required to move cradle 19 transversely to move rails 86 into the desired final alignment with rail extensions 87. Rails 86 and rail extensions 87 may then be secured together in any suitable manner as by a suitable interconnecting bracket 124, Figure 2.

Crank 107 is then actuated in a clockwise direction (as viewed in Figure 6) to position shoe 113 at the rear of apparatus 13, conveyor bar 115 will at this time be manually pivoted to be disposed rearwardly at an angle, bar 115 is then suitably secured to the appropriate fitting upon jet engine 12 to effect the desired interconnections between shoe 113 and engine 12. The C clamp or other means securing engine 12 against longitudinal movement is then released.

Crank 107 is now actuated to effect forward movement of shoe 113 with consequent forward movement of engine 12 upon tubular rails 86 of cradle 19 until shoe 113 has reached the forward end of track 114; at this point conveyor bar 115 is detached from shoe 113 and jet engine 12. Shoe 113 is repositioned a short distance rearwardly, and conveyor bar 115 is then reattached to engine 12 and shoe 113 with bar 115 this time being disposed forwardly at an angle. Crank 107 is again actuated to effect forward movement of shoe 113. In this movement conveyor bar 115 applies a pushing force upon engine 12 to move it forwardly upon rail extensions 87 and into desired position within fuselage 16. Engine 12 is then secured within the airplane 11 in the usual and conventional manner and conveyor bar 115 is detached.

The reverse operation of removal of engine 12 from aircraft 11 is readily accomplished by use of the conveyor bar 115 and shoe 113 in reverse fashion to that above described.

Apparatus 13 serves a further use other than for installation and removal of the engine in that it can act as a work or repair stand since when engine 12 is mounted upon handling apparatus 13, convenient access to engine 12 may be had for repairs or the like, thus obviating the necessity for a separate repair or work stand when the engine is not in aircraft 11.

Thus, the apparatus 13 of the present invention provides a simple and effective means for manipulating or handling an engine 12 during the installation, removal, repair, or inspection thereof, with a unique construction being afforded for the adjustment of the vertical, transverse, and longitudinal position of the engine with respect to an engine carrying vehicle such as an aircraft.

While certain preferred embodiments of the invention have been specifically disclosed, it is understood that the invention is not limited thereto as many variations will be readily apparent to those skilled in the art and the invention is to be given its broadest possible interpretation with the terms of the following claims.

What we claim is:

1. Engine handling apparatus comprising a mobile base frame structure, a supporting structure movably positioned upon said frame, said frame structure being comprised of a plurality of interconnected hollow members, means coupled between said frame and said supporting structure for adjustably changing the relative lateral positions of said frame and said supporting structure, said supporting structure including horizontally positioned ways adapted to support an engine for longitudinal movement thereover, means carried by said supporting structure for moving said engine over said ways, means comprising individually operable jack members carried by said frame for adjustably locating the vertical position of said frame relative to the ground, and means for adjustably changing the relative vertical positions of said frame and said supporting structure, said last mentioned means including cable means internally disposed within said hollow members of said frame structure and operatively connected to said supporting structure and actuating means carried by said frame for effecting adjustable displacement of said cable means.

2. Object handling apparatus for transferring an object to an object receiving structure, said apparatus comprising a mobile base frame, a supporting structure movably positioned upon said frame and embodying upright supports and longitudinal guide means secured to the upper ends of said upright supports whereby said guide means are adapted for supporting an object for rolling movement there along, means for adjustably changing the vertical and lateral positions selectively of said supporting structure relative to said frame to align said longitudinal guide means with said object receiving structure, said means for lateral positioning including a first and second means independently actuable for adjustably changing the lateral position of the forward and rearward ends of said supporting structure relative to said frame, and locating means for adjustably changing the longitudinal position of said object upon said longitudinal guide means of said supporting structure whereby said object may be rolled within said object receiving structure, said locating means including cable means adapted for operative connection between said mobile base frame and said object upon said longitudinal guide means.

3. Engine handling apparatus for transferring an engine to an engine receiving structure, said structure comprising a mobile base frame, a supporting structure movably positioned upon said frame and embodying upright supports and longitudinal guide means secured to the upper ends of said upright supports whereby said guide means are adapted for supporting an engine for rolling movement therealong, means for adjustably changing the vertical and lateral positions selectively of said supporting structure upon said frame to align said longitudinal guide means with said engine receiving structure, said means for lateral positioning including a first and second means independently actuable for adjustably changing the lateral position of the forward and rearward ends of said supporting structure relative to said frame, and means for adjustably locating the longitudinal position of said engine upon said longitudinal guide means of said supporting structure whereby said engine may be rolled within said engine receiving structure, said last mentioned means including a longitudinal track secured to said supporting structure, a shoe slidable along said track means, means adapted for connecting said shoe to said engine upon said longitudinal guide means, and means for moving said shoe along said track whereby said engine may be moved.

4. Engine handling apparatus for transferring an engine to an engine receiving structure, said structure comprising a mobile base frame, a supporting structure adjustably positioned upon said frame and embodying upright supports and longitudinal guide means secured to the upper ends of said upright supports whereby said guide means are adapted for supporting an engine for rolling movement therealong, means comprising individually operable jack members carried by said frame for adjustably locating the vertical position of said frame relative to the ground, means for adjustably changing the vertical and lateral positions selectively of said supporting structure relative to said frame to align said longitudinal guide means with said engine receiving structure, said means for lateral positioning including a first and second means independently actuable for adjustably changing the lateral position of the forward and rearward ends of said supporting structure relative to said frame, a longitudinal track secured to said supporting structure, a shoe slidable in said track, a conveyor bar adapted to be pivotally secured at one end to said engine and at the other end to said shoe, cable means secured to said shoe, and means for moving said cable means to thereby adjustably locate the longitudinal position of said engine upon said longitudinal guide means of said supporting structure whereby said engine may be rolled within said engine receiving structure.

5. Engine handling apparatus for transferring an engine to an engine receiving structure, said structure comprising a mobile base frame, a supporting structure movably positioned upon said frame and embodying upright supports and longitudinal guide means secured to the upper ends of said upright supports whereby said guide means are adapted for supporting an engine for rolling movement therealong, a first and a second means independently actuable for adjustably changing the lateral position of the forward and rearward ends of said supporting structure relative to said frame to align said longitudinal guide means with said engine receiving structure, and means for adjustably locating the longitudinal position of said engine upon said longitudinal guide means of said supporting structure whereby said engine may be rolled within said engine receiving structure, said last mentioned means including cable means adapted for operative connection between said mobile base frame and said engine upon said longitudinal guide means.

6. Engine handling apparatus for installing an engine in an elongated engine receiving structure, said apparatus comprising a base frame adapted for movement behind said elongated engine receiving structure, a supporting structure movably positioned upon said frame and embodying longitudinal guide means adapted for movably supporting an engine, a first crank operatively connected between the forward portions of said supporting structure and said frame for adjustably positioning said supporting structure laterally relative to said frame, a second crank operatively connected to the rearward portions of said supporting structure and said frame for adjustably positioning said supporting structure laterally relative to said frame whereby selective operation of said first crank and said second crank assists in the longitudinal aligning of said engine with said elongated engine receiving structure, and means for selectively positioning said engine along said longitudinal guide means of said supporting structure whereby said engine may be rolled within said engine receiving structure, said last mentioned means including cable means adapted for operative connection between said mobile base frame and said engine upon said longitudinal guide means.

References Cited in the file of this patent

UNITED STATES PATENTS

| | | |
|---|---|---|
| 1,571,178 | Donovan | Feb. 2, 1926 |
| 1,771,054 | McConnell | July 22, 1930 |
| 2,106,878 | Sinclair | Feb. 1, 1938 |
| 2,305,906 | Smith | Dec. 22, 1942 |
| 2,349,389 | Thompson | May 23, 1944 |
| 2,479,623 | Johnson | Aug. 23, 1949 |
| 2,620,930 | Mullgardt | Dec. 9, 1952 |
| 2,633,809 | Robinson, et al. | Apr. 7, 1953 |